United States Patent [19]
Shimizu

[11] Patent Number: 5,926,446
[45] Date of Patent: Jul. 20, 1999

[54] OPTICAL INFORMATION RECORDING MEDIUM AND A METHOD OF TRACKING SERVO FOR OPTICAL INFORMATION RECORDING MEDIUM

[75] Inventor: Akihiko Shimizu, Yokohama, Japan

[73] Assignee: Ricoh Company, Ltd., Tokyo, Japan

[21] Appl. No.: 08/815,712

[22] Filed: Mar. 12, 1997

[30] Foreign Application Priority Data

Mar. 12, 1996 [JP] Japan .................................. 8-081900

[51] Int. Cl.⁶ ............................................. G11B 7/09
[52] U.S. Cl. .................................... 369/44.26; 369/275.4
[58] Field of Search ........................... 369/44.26, 44.29, 369/44.35, 44.34, 275.1, 275.3, 275.4, 44.27, 13

[56] References Cited

U.S. PATENT DOCUMENTS

| | | | |
|---|---|---|---|
| 5,199,022 | 3/1993 | Suzuki et al. | 369/275.1 |
| 5,204,852 | 4/1993 | Nakagawa et al. | 369/275.4 |
| 5,383,176 | 1/1995 | Inui et al. | 369/275.4 |
| 5,493,552 | 2/1996 | Kobori | 369/275.4 |
| 5,602,823 | 2/1997 | Aoki et al. | 369/275.3 |
| 5,673,250 | 9/1997 | Mieda et al. | 369/275.4 |

FOREIGN PATENT DOCUMENTS

| | | |
|---|---|---|
| 4-362526 | 12/1992 | Japan . |
| 5-135362 | 6/1993 | Japan . |
| 6-76362 | 3/1994 | Japan . |

*Primary Examiner*—Thang V. Tran
*Attorney, Agent, or Firm*—Oblon, Spivak, McClelland, Maier & Neustadt, P.C.

[57] ABSTRACT

The invention provides an optical information recording medium capable of optionally setting the capacitance of the ROM and keeping the physical continuousness in the ROM track and the RAM track. The medium is the optical information recording medium in the land/groove recording system in which the information is recorded both in the convex groove track called land L and in the concave groove track called groove G, and it includes commonly in a sheet of medium a ROM area constructed with the pre-pit row previously formed on the basic substrate and a RAM area capable of being additionally written by the user. The track pitch of the pre-pit row in the ROM area is equal to that of the groove. The RAM area exists on the plain portion between the just adjacent pre-pit rows in the ROM area and on both portions of the land and the groove.

7 Claims, 10 Drawing Sheets

FIG. 12A — MANUFACTURING OF ORIGINAL RESIST BOARD — PHOTORESIST FILM 1202, GLASS SUBSTRATE 1202

FIG. 12B — EXPOSING OF ORIGINAL BOARD — LATENT IMAGE, Ar LASER 1203

FIG. 12C — DEVELOPING

FIG. 12D — PROCESSING OF CODUCTIVE COVERING FILM FORMATION — Ni FILM 1204

FIG. 12E — Ni ELECTRIC CASTING

FIG. 12F — PROCESSINGS OF PEELING OFF, CLEANING, REAR SURFACE POLISHING — STAMPER 1205

OPTICAL INFORMATION RECORDING MEDIUM AND A METHOD OF TRACKING SERVO FOR OPTICAL INFORMATION RECORDING MEDIUM

BACKGROUND OF THE INVENTION

1. Field of the Invention

The present invention relates to an optical information recording medium and a tracking servo method for the optical information recording medium in particular, an optical information recording medium of land/groove recording method in which the information is recorded both on a convex groove track called land and on a concave groove track called groove and which comprises a ROM area constructed with a pre-pit row previously formed on a basic substrate and a RAM area capable of being written additionally by the user both provided on a sheet of medium, and a tracking servo method for the above-mentioned optical information recording medium.

2. Description of the Related Art

As described in, for instance, Japanese Laid-open Patent Publication No. 6-76362/1994 entitled "AN OPTICAL DISK AND A METHOD OF MANUFACTURING IT", Japanese Laid-open Patent Publication No. 5-135362/1993 entitled "A MEMBER FOR RECORDING INFORMATION AND A RECORDING APPARATUS", and Japanese Laid-open Patent Publication No. 4-362526/1992 entitled "AN OPTICAL DISK" (as the conventional optical information recording medium, there has existed an optical information recording medium employing a land/groove recording method of recording the information both on the convex groove track called land and on the concave groove track called groove.

In the above-mentioned two laid-open patent applications; Japanese Laid-open Patent Publication No. 6-76362/1994 "AN OPTICAL DISK AND A METHOD OF MANUFACTURING IT" and Japanese Laid-open Patent Publication No. 5-135362/1993 "A MEMBER FOR RECORDING INFORMATION AND A RECORDING APPARATUS", the ROM area constructed with the pre-pit row previously formed on the basic substrate and the RAM area capable of being additionally written by the user on a sheet of medium are provided together in a sheet of medium.

Figure 15:
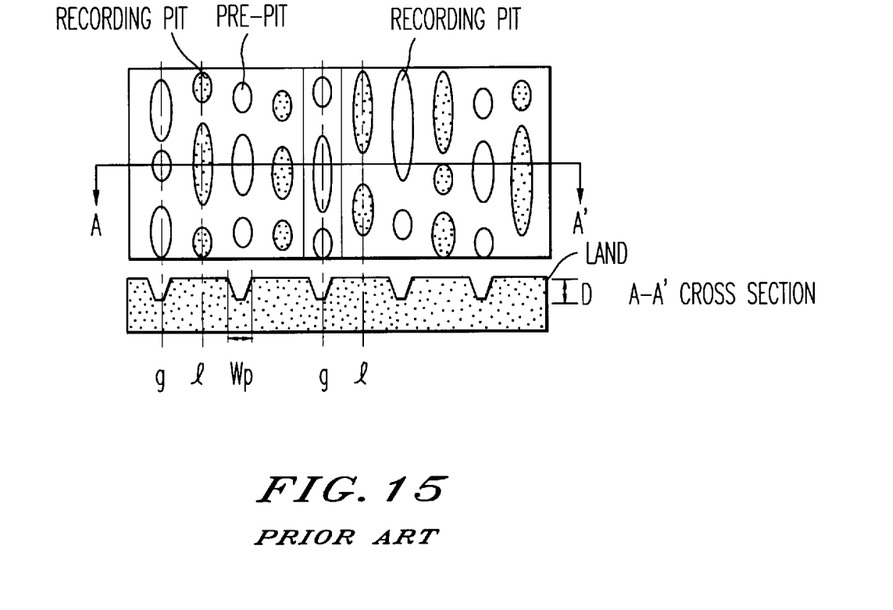
FIG. 15 is a diagram showing the surface and the cross section of the basic substrate in a conventional optical information recording medium.

Here, an optical information recording medium according to Japanese Laid-open Patent Publication No. 6-76362/1994 "AN OPTICAL DISK AND A METHOD OF MANUFACTURING IT" is explained, referring to FIG. 15. In this optical disk (optical information recording medium), the ROM area is constructed with the pre-pit rows, as shown in FIG. 15, and the RAM track area for additionally writing the information exists on the plain portion between the pre-pit rows. The address information needed at the time of additionally writing is constructed with the pre-pit on the ROM track and the additionally written record pit on the RAM track. For this reason, it is possible to reduce the cross-talk from the tracks adjacent to each other.

And further, only the pre-pit row on which the address information is formed is displaced (shifted) in the radius direction by ¼ track pitch from the track center, and thereby it is possible for the ROM and the RAM to commonly occupy the address information constructed with one pre-pit row.

Figure 16:
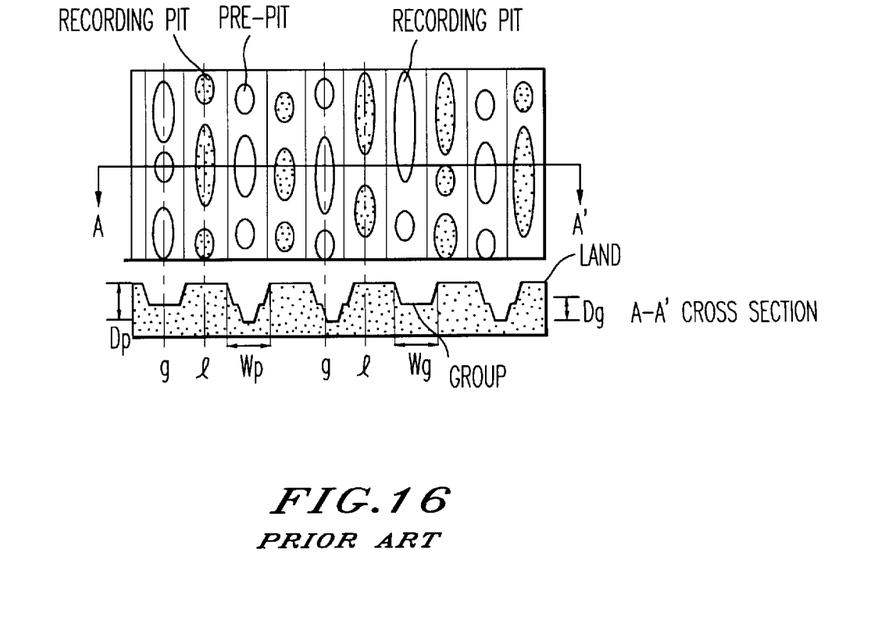
FIG. 16 is another diagram showing the surface and the cross section of the basic substrate in the conventional optical information recording medium.

And further, the optical information recording medium according to Japanese Laid-open Patent Publication No. 5-135362/1993 "A MEMBER FOR RECORDING INFORMATION AND A RECORDING APPARATUS" is the one intending to reduce the cross-talk from the adjacent tracks by employing the ROM for either one of the land and the groove and employing the RAM for another thereof, as shown in FIG. 16. Moreover, in the above optical information recording medium, the address information of the ROM and that of the RAM are respectively arranged on the tracks constructed with the land and the groove respectively.

On the other hand, in Japanese Laid-open Patent Publication No. 4-362526/1992 "OPTICAL DISK", assuming that the pre-pit and the groove are arranged on the land and the groove depth of the pre-pit disposed on the land is Hp and that of the groove is Hg, a high modulation rate can be obtained by setting the groove depth of the pre-pit disposed on the tracking of the groove to (Hp+Hg) in case that the reproducing beam diameter is sufficiently narrower than the groove width.

SUMMARY OF THE INVENTION

However, in the above-mentioned conventional technologies (prior arts), there have arisen some problems to be solved as mentioned hereinafter.

Firstly, according to Japanese Laid-open Patent Publication No. 6-76362/1994, there exists no groove as the tracking guide groove, as shown in FIG. 15. Furthermore, since the information is additionally written on the plain portion between the immediately adjacent pre-pits in the ROM, it is necessary to provide the ROM tracks (pre-pit rows) over the entire surface of the optical information recording medium. In other words, the pre-pit row is utilized as the tracking guide groove, and since the tracking treatment cannot be done if there exists no pre-pit row, it is necessary to provide the pre-pit rows over the entire surface of the optical information recording medium. For this reason, in the case of employing the optical information recording medium comprising both of the ROM and the RAM, it is desirable to optionally select the amount of the ROM information. However, when the amount of the information is small (when it is at least not larger than the half of the capacitance per one sheet), there exists unnecessary pre-pit row having no meaning as the information, and thereby the recording capacitance per one sheet capable of employing as the RAM may be reduced. The above is the problem to be solved.

Secondly, since the ROM track and the RAM track are arranged alternately and there is no physical continuousness between the ROM track and the RAM track, it is necessary to take a seeking time at the time of reproducing and thereby the transferring rate for the information becomes lowered. This is the problem to be solved.

Thirdly, although the ROM track and the RAM track are arranged alternately, in case that the reflection rate of the recording material is lowered by recording, the amplitude of the tracking error signal is reduced by additionally writing. Consequently, there occurs a difference in the adequate tracking gain between the ROM track having not-recorded adjacent tracks and the other ROM track having recorded adjacent tracks. In such state, if the servo operation is done with same gain, the tracking becomes unstable due to the insufficient gain in the case of employing the ROM track having recorded adjacent tracks, and thereby a deviation (shifting) of the tracking occurs. The above is a problem to be solved.

Fourthly, according to Japanese Laid-open Patent Publication No. 4-362526/1992, since the groove depth of the pre-pit existing on the land is different from that of the pre-pit existing on the groove, it is necessary to change the exposing laser power (Pw) at the original board exposing process for making a stamper in order to form the pre-pits respectively having the different groove depths on a sheet of basic substrate.

Figure 17:
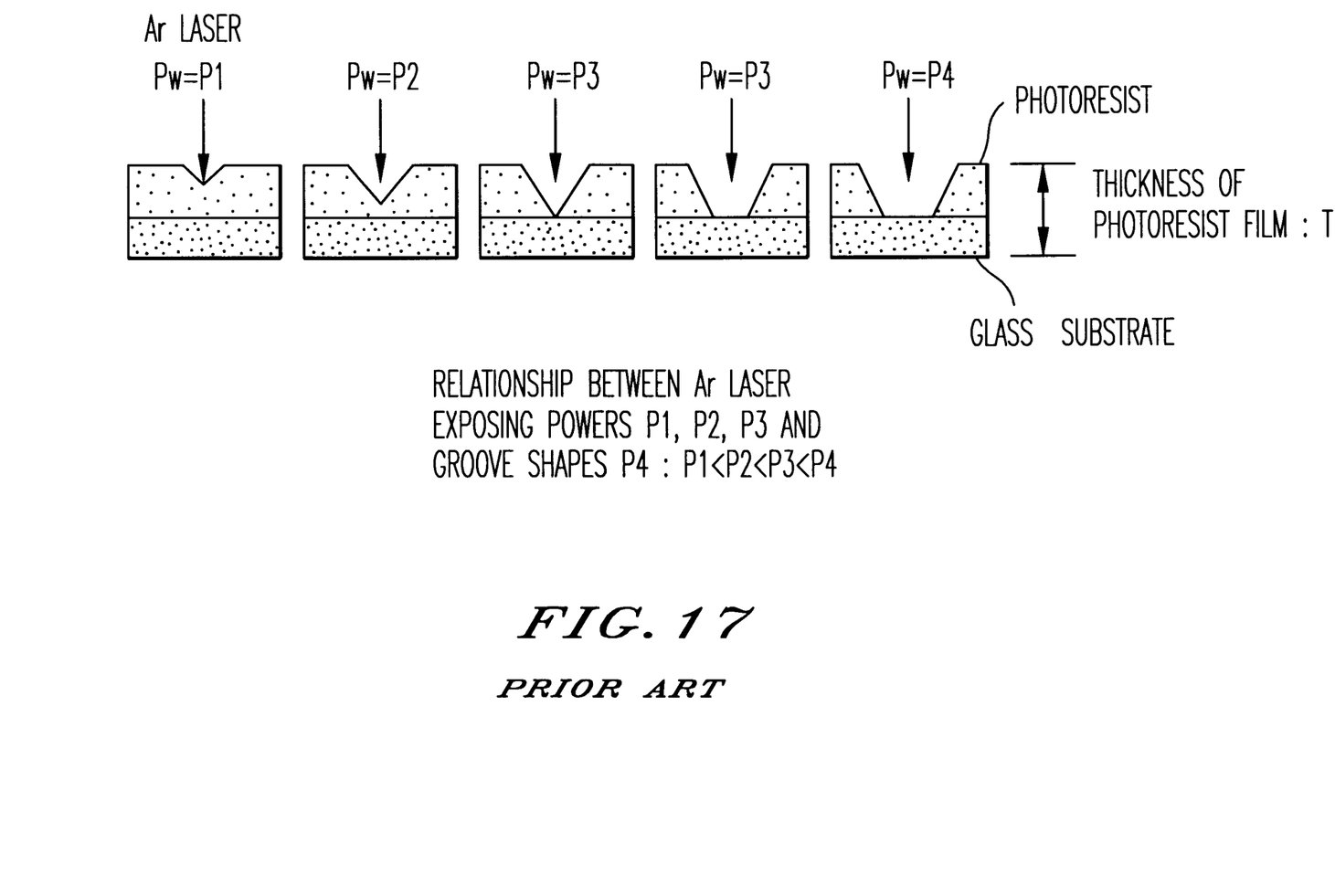
FIG. 17 is a diagram showing the relationship between the exposing laser power and the groove shape in the conventional optical information recording medium.

Nevertheless, as shown by the relationship between the laser power and the groove shape in FIG. 17, in the case of forming the pre-pit having the groove depth not reaching the photoresist film thickness, the cross section of the groove becomes V-shaped or U-shaped form instead of trapezoid form and thereby the tracking may become unstable. This is also a problem to be solved.

Fifthly, in case that the pre-pit has the groove depth smaller than the film thickness of the photoresist, since the groove depth of the pre-pit is apt to vary due to the variation of the exposing laser power, the tracking error signal and the variation of the modulation rate may occur, and as the result the tracking deviation and the reproducing error of the information may happen. This is also a problem to be solved.

The present invention has been made in consideration of the above-mentioned actual circumstances and troublesome matters to be solved.

It is an object of the present invention to solve the points at issue as mentioned heretofore.

It is another object of the present invention to provide an optical information recording medium capable of optionally setting the capacitance of the ROM and keeping the physical continuousness of the ROM track and the RAM track.

It is still another object of the present invention to provide an optical information recording medium having a high tracking stability both in the ROM area and in the RAM area even though the groove depth of the pre-pit is equal to that of the groove and capable of stably performing the recording and reproducing of the information.

It is still another object of the present invention to provide a method of tracking servo for recording and reproducing the optical information in which the recording state of the respective tracks in the ROM area and the RAM area can be judged precisely.

It is still another object of the present invention to provide a method of tracking servo for recording and reproducing the optical information in which, even though the adequate gain in the ROM area is different from that in the RAM area or the adequate gains are different from each other in accordance with the presence or absence of the recording, the tracking stability in the ROM area and the RAM area is high and thereby the recording and reproducing of the information can be done stably.

It is still another object of the present invention to provide an optical information recording medium in which a stable tracking state can be obtained by making the adequate gain in the ROM area equal to that in the RAM area.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENT

In order to attain the afore-mentioned object(s) of the present invention, the first status of the invention provides an optical information recording medium of land/groove recording system in which information is recorded on both of a convex groove track named land and a concave groove track named groove, in which the optical information recording medium includes a ROM area constructed with a pre-pit row previously formed on a basic substrate together with a RAM area capable of being additionally written by a user on a sheet of medium, and in which track pitch of the pre-pit row of the ROM area is equal to that of the groove, and the RAM area exists on a plain part between the pre-pit rows of the ROM area and both parts of the land and said groove.

In order to attain the aforementioned object(s) of the present invention, the second status of the invention provides an optical information recording medium as defined in the first status of the invention in which a concave continuous groove track does not exist in the ROM area constructed with the pre-pit rows, and in which, assuming that the groove depth of the pre-pit is Dp, the groove depth of the groove is Dg, the wavelength of recording/reproducing laser beam for the optical information recording medium is $\lambda$, and the refractive index of the basic substrate of the optical information recording medium is n, those factors satisfy the following equality/inequalities:

$$\lambda/n \times 0.12 \leq Dp = Dg \leq \lambda/n \times 0.24.$$

In order to attain the aforementioned object(s) of the present invention, the third status of the invention provides an optical information recording medium as defined in the first status of the invention in which a concave continuous groove track does not exist in the ROM area constructed with the pre-pit rows, and in which, assuming that the groove width of the pre-pit is Wp and the beam diameter of recording/reproducing laser beam for the optical information recording medium is BD, those factors satisfy the following inequalities:

$$BD \times 0.30 \leq Wp \leq BD \times 0.45.$$

In order to attain the aforementioned object(s) of the present invention, the fourth status of the invention provides a method of tracking servo for recording and reproducing optical information, by use of the optical information recording medium as defined in the first status of the invention in which the method of tracking servo is separately classified into six groups, in order to judge the recording state of a track to be treated with tracking in the optical information recording medium, and the groups are;

a first group of having not-yet-recorded track to be treated with tracking and other not-yet-recorded tracks adjacent to the track to be treated with tracking,
a second group of having not-yet-recorded track to be treated with tracking and having either recorded one of the other tracks adjacent to the track to be treated with tracking,
a third group of having not-yet-recorded track to be treated with tracking and having all of the other recorded tracks adjacent to the track to be treated with tracking,
a fourth group of having recorded track to be treated with tracking or having both of not-yet-recorded tracks adjacent to the ROM and the track,
a fifth group of having recorded track to be treated with tracking or having either recorded one of the tracks adjacent to the ROM and the track, and
a sixth group of having recorded track to be treated with tracking or having both of the recorded tracks adjacent to the ROM and the track.

In order to attain the aforementioned object(s) of the present invention, the fifth status of the invention provides a method of tracking servo for recording and reproducing optical information by use of the optical information recording medium, as defined in the fourth status of the invention in which, when the tracking servo is executed in an address area separatedly classified into the six groups, at least two different tracking servo gains are established corresponding to the six groups, and the tracking servo gains are changed over in accordance with the six groups.

In order to attain the aforementioned object(s) of the present invention, the sixth status of the invention provides a method of tracking servo for recording and reproducing optical information by use of the optical information recording medium, as defined in the fifth status of the invention in which, in case that the reflection rate of the portion recorded by recording laser beam falls down, the magnitudes of the tracking servo gains are respectively set to the value larger than the just before value in the order of the first, second, third, fourth, fifth, and sixth groups.

In order to attain the aforementioned object(s) of the present invention, the seventh status of the invention provides a method of tracking servo for recording and reproducing optical information by use of the optical information recording medium, as defined in the fifth status of the invention in which, in case that the reflection rate of the portion recorded by recording laser beam rises up, the magnitudes of the tracking servo gains are respectively set to the value larger than the just before value in the order of the sixth, fifth, fourth, third, second, and first groups.

In order to attain the aforementioned object(s) of the present invention, the eighth status of the invention provides an optical information recording medium as defined in the first status of the invention in which the ROM area and the address information showing the range of additionally written portion are provided in addition to the area in which the user records the data.

In order to attain the aforementioned object(s) of the present invention, the ninth status of the invention provides a method of tracking servo for recording and reproducing optical information, by use of the optical information recording medium as defined in the eighth status of the invention in which, in order to judge the recording state of a track to be treated with tracking in the optical information recording medium, a judgment whether an address to be treated with tracking has been already recorded is performed on the basis of the ROM area and the address information showing the range of the additionally written portion, and next, another judgment whether another address of the address adjacent to the track to be treated with tracking has been already recorded is performed, and finally, in accordance with the results of the judgments, the method of tracking servo is separatedly classified into six groups, and the groups are;

a first group of having not-yet-recorded track to be treated with tracking and other not-yet-recorded tracks adjacent to the track to be treated with tracking,
a second group of having not-yet-recorded track to be treated with tracking and having either recorded one of the other tracks adjacent to the track to be treated with tracking,
a third group of having not-yet-recorded track to be treated with tracking and having all of the other recorded tracks adjacent to the track to be treated with tracking,
a fourth group of having recorded track to be treated with tracking or having both of not-yet-recorded tracks adjacent to the ROM and the track,
a fifth group of having recorded track to be treated with tracking or having either recorded one of the tracks adjacent to the ROM and the track, and
a sixth group of having recorded track to be treated with tracking or having both of the recorded tracks adjacent to the ROM and the track.

In order to attain the aforementioned object(s) of the present invention, the tenth status of the invention provides an optical information recording medium as defined in the first status of the invention in which the recording layer of the optical information recording medium is formed with an optomagnetic material capable of reading out the information by the variation of the polarizing surface for the light rays reflected from the additionally written portion.

Practiced Statuses of the Embodiment According to the Present Invention

An optical information recording medium and a method of tracking servo for optical information recording medium are described hereinafter in detail, in the order of "groove distribution on the optical information recording medium of the invention", "limited area of the groove shape on the optical information recording medium of the invention", "outline of the method of tracking servo for the optical information recording medium of the invention", "first embodiment", and "second embodiment", referring to the accompanying drawings.

<Groove Distribution on the Optical Information Recording Medium of the Invention>

Figure 1:
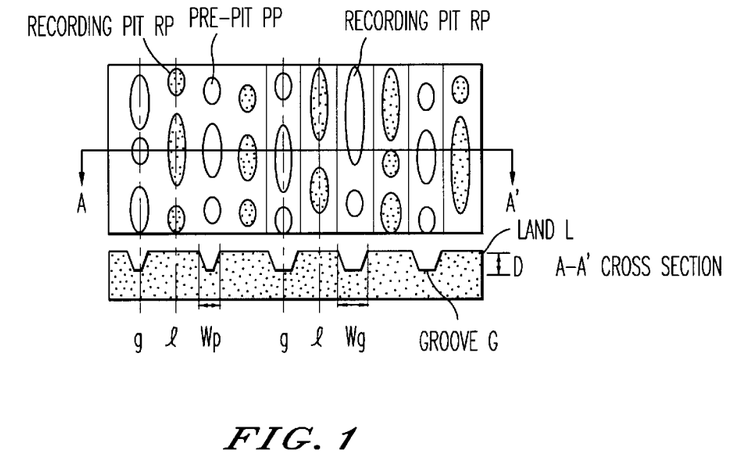
FIG. 1 is a diagram showing the surface and the cross section of the basic substrate in an optical information recording medium of an embodiment according to the present invention.

FIG. 1 is a cross sectional view showing the surface and the cross section of the basic substrate of the optical information recording medium according to the present invention. There exist phase grooves formed in a concave shape (pre-pit PP and groove G) and recording pit RP recorded on a film-formed recording layer on the surface of the basic substrate.

As shown in FIG. 1, the groove shape comprises ROM area constructed with a pre-pit row as a spiral or coaxially circular track, RAM area constructed with a plain portion between the above-mentioned pre-pit rows, and another RAM area constructed with the land L and the groove G as a spiral or coaxially circular track.

Figure 2:
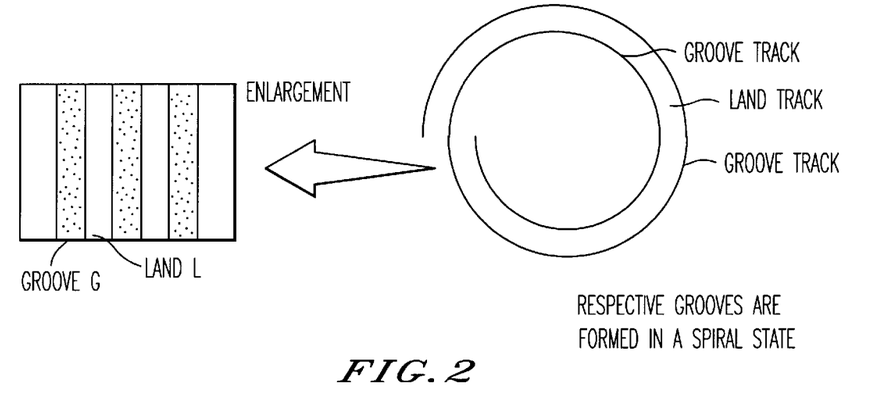
FIG. 2 is a diagram showing a track arrangement of the optical information recording medium according to the present invention.

As shown in FIG. 15, in the conventional optical information recording medium, since the ROM track and the RAM track are arranged alternately, there is no physical track continuousness between the ROM row and the RAM row. On the contrary, in the present invention, since the ROM row and the RAM row are arranged continuously (in a spiral state) on the groove track or the land track as shown in FIG. 2, there is no distinction, and thereby the physical continuousness can be kept.

Here, the arrangement of the pre-pit rows and the tracking on the optical information recording medium of the present invention is explained referring to FIG. 1. The pre-pit row, the recording pit row recorded on the plain portion between the pre-pit rows, and the tracking center of the recording pit rows recorded on the land L and the groove G are respectively shown by dot-and-dash lines. And further, the polarity of the tracking at the respective tracking center is shown by "g" in the case of tracking and reproducing on the center of the groove G and by "l" in the case of tracking and reproducing on the center of the land L just below the dot-and-dash lines.

Referring to FIG. 1, the ROM bit row and the recording pit row recorded in the grove G exist on the groove track ("g" in FIG. 1), and both are continuous on the groove track. And further, the pre-pit row, the pre-pit row g recorded on the plain portion between the pre-pit rows, and the pre-pit row g in the land exist on the land track ("l" in FIG. 1), and both are continuous on the land track.

<Limited Area of the Groove Shape on the Optical Information Recording Medium of the Invention>

Next, the reason why the depth of the groove on the optical information recording medium is limited in the present invention is explained referring to the FIG. 3 through FIG. 8.

Figure 3:
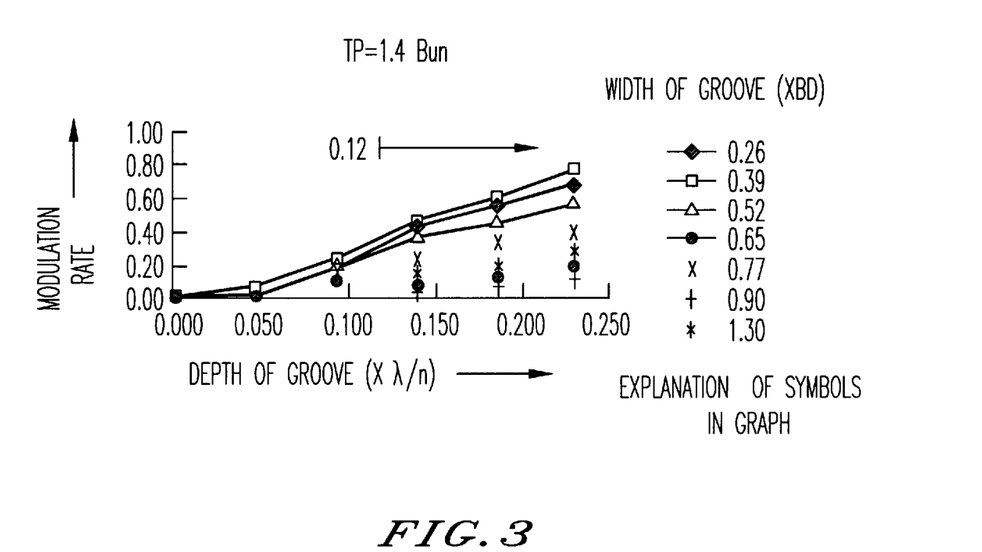
FIG. 3 is a diagram showing the relationship between the groove shape and the modulation rate.

FIG. 3 is a diagram (graph) showing the relationship between the groove shape and the modulation rate. The groove depth shown in FIG. 3 is applicable to both of the groove G and the pre-pit PP. By use of the reproducing optical system shown in FIG. 4a, the beam focused on the surface of the basic substrate and reflected thereon is converted from light to electricity by a PD (photo detector), and the variation of the reflected beam's intensity can be detected as an electric signal.

Figure 4A:
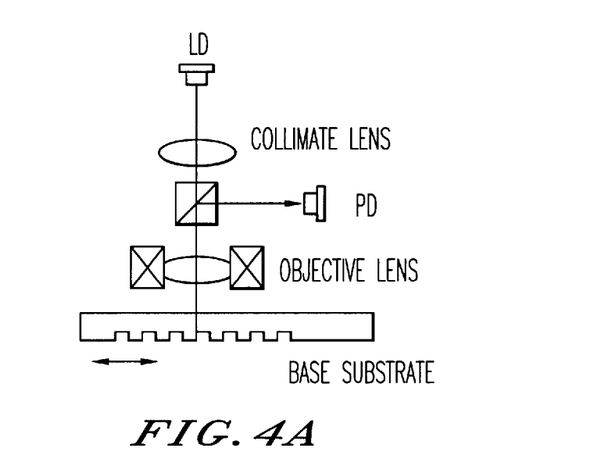
FIGS. 4a and 4b are diagrams showing a reproducing optical system.
Figure 4B:
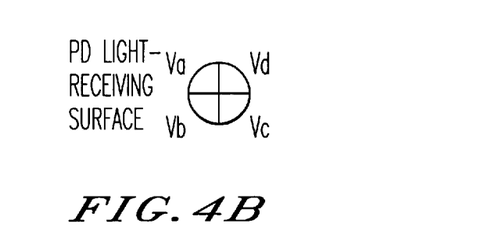

The light-receiving surface of the PD is, as shown in FIG. 4b, divided into four. The sum of the divided signals from the light-receiving surface (Va+Vb+Vc+Vd, hereinafter called "Rf signal") is employed as a data reproducing signal, while the difference of the divided signals from the light-receiving surface (Va+Vb−Vc−Vd, hereinafter called "push-pull signal") is employed as a tracking error signal.

Figure 5:
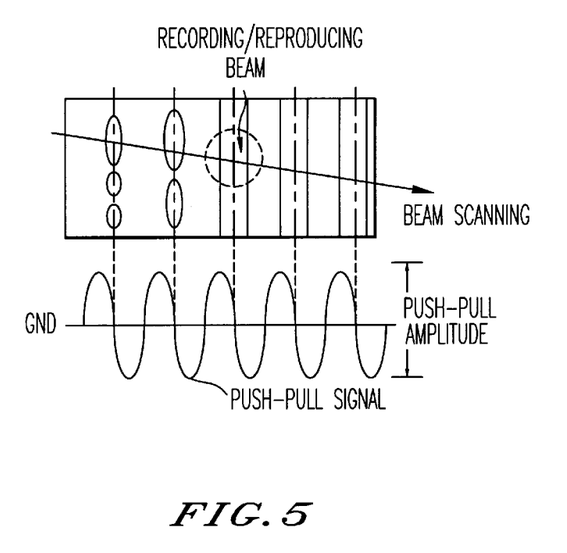
FIG. 5 is a diagram showing the relationship between the groove arrangement and the push-pull signal.

FIG. 5 shows the relationship between the groove arrangement and the push-pull signal. When the recording/reproducing beam passes through on the track center of the groove G, the push-pull signal becomes zero (GND). The amplitude values ot the Rf signal and the push-pull signal vary in accordance with the groove shapes of the pre-pit PP and the groove G.

Figure 6:
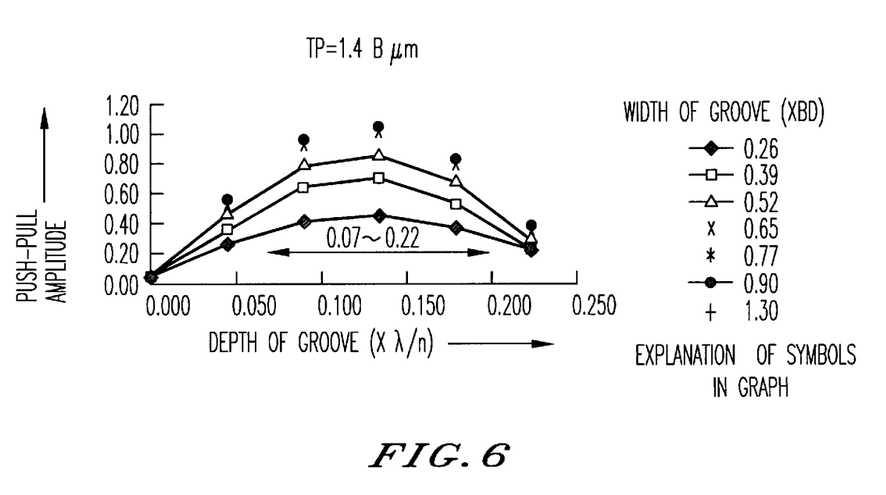
FIG. 6 is a diagram showing the relationship between the shape of the groove and the push-pull amplitude.

Here, the relationship between the groove shape and the characteristics of the respective signals referring to FIG. 3 and FIG. 6. (FIG. 6 shows the relationship between the groove shape and the push-pull amplitude.) When the reproduced beam scans on the track center constructed with the pre-pit beam row, there arises a difference between the light reflection intensities (contrasts) both on the portions of the pre-pit PP existence and non-existence. The variation of the Rf signal can be obtained from the difference of the light reflection intensities. The variation value of the Rf signal caused by the pre-pit PP (amplitude) becomes the modulation rate.

In FIG. 3, the track pitch (IP) is 1.48 μm, and the beam diameter of the recording/reproducing laser beam (BD; here, the beam diameter takes a value width of 1/e2) is 0.93 μm. And further, the groove depth in the horizontal axis is the optical phase depth. The groove width in the "explanation of symbols in graph" is shown by the multiple representation for the beam diameter. Namely, the value of the groove width can be obtained by multiplying the figure shown in the "explanation of symbols in graph" by the value of BD.

In order to precisely reproduce the information recorded on the pattern of the pre-pit row (the length of the pre-pit PP and the distance between the pre-pit PP), it is desirable to make the modulation rate at least equal to or larger than 0.30 in the signal reproducing circuit.

And further, as in the case of FIG. 3, in the relationship between the groove shape and the push-pull amplitude shown in FIG. 6 defining the parameters of TP, BD, and groove shape, it is desirable to make the push-pull amplitude at least equal to or larger than 0.3 in the tracking control circuit. The relationship between the modulation rate and the push-pull amplitude is the relation of the trade-off. In case that the groove depth of the pre-pit PP is equal to that of the groove G, it is possible to limit both ranges of the groove depth (D) of the pre-pit PP and the groove G and the groove width (W) of the pre-pit PP. The ranges-thus limited respectively satisfy the following inequalities:

Here, λ is the wavelength of the reproducing laser beam, and n is the refractive index of the basic substrate.

Groove Depth $$0.12 \times \lambda/n \leq D \leq 0.22 \times \lambda/n$$

Groove Width $$0.26 \times BD \leq W \leq 0.52 \times BD$$

Consequently, if the groove shape ot the optical information recording medium shown in FIG. 1 is established in accordance with the ranges as shown by the above two inequalities, it is possible to obtain the stable reproducing state of the data.

<Outline of the Method of Tracking Servo for the Optical Information Recording Medium of the Invention>

The servo gain in the tracking control according to the present invention is explained hereinafter.

Generally, regarding the recording material for the optical information recording medium, there exist two types; those are, a write-once type such as an organic pigment material or an inorganic pigment material having the reflection rate of the recording pit RP varying by the recording, and an erasable type employing the phase variation material. Those two types have been used very frequently.

Figure 7:
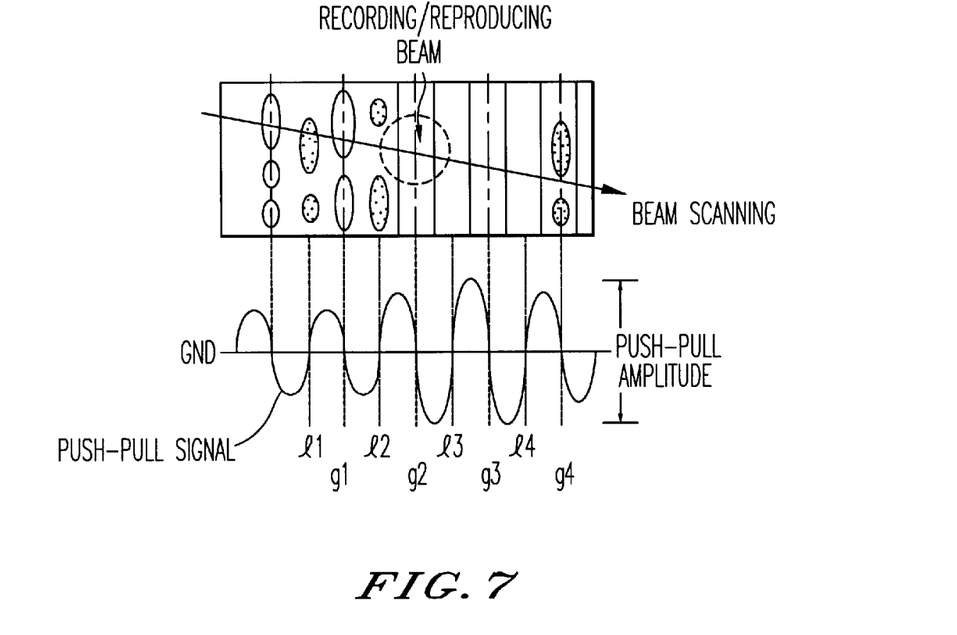
FIG. 7 is a diagram showing the recording portion and the push-pull amplitude variation in case that the reflection rate on the recording portion decreases.

In case that such recording materials are used, since the reflection rate of the recorded portion (recording pit RP) varies, the push-pull amplitude varies also before and after the recording. For instance, when the reflection rate on the recording portion decreases, there arises a relationship between the recording portion and the push-pull amplitude variation as shown in FIG. 7. Furthermore, when the reflection rate on the recording portion increases, there arises another relationship between the recording portion and the push-pull amplitude variation as shown in FIG. 8.

As the result, there arises a large difference in the values of the push-pull amplitude between the recorded portion and not-recorded portion. Furthermore, in case that the track pitch is smaller than the beam diameter of the recording/reproducing laser beam, it is impossible to ignore the influence exerted by the adjacent track(s).

For instance, in case that the reflection rate of the recording portion decreases as shown in FIG. 7, assuming that the ROM track having both-sides adjacent tracks both recorded is g1, the groove track having only one-side adjacent track recorded is g2, the groove track not recorded having no adjacent track recorded is g3, and the groove track recorded having no adjacent track recorded is g4, the push-pull amplitudes of the respective groove tracks vary, on the condition of satisfying the inequalities of g3>g2>g4>g1. As shown in FIG. 7, the push-pull amplitudes viewing at the land tracks l1, l2, l3, and l4 vary also, on the condition of satisfying the same result as that of the groove tracks, namely, the push-pull amplitudes of the respective land tracks l1, l2, l3, and l4 vary in the order of l3>l2>l4>l1. Moreover, even though the ROM track of g1 is the recorded groove track, the same result can be obtained.

Figure 8:
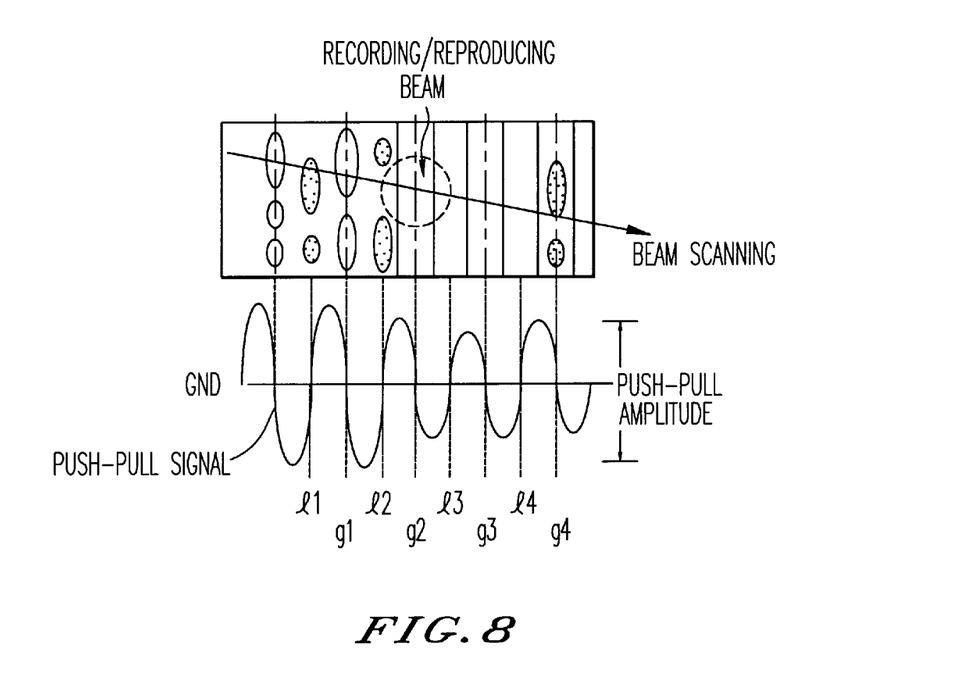
FIG. 8 is a diagram showing the recording portion and the push-pull amplitude variation in case that the reflection rate on the recording portion increases.

Furthermore, in case that the reflection rate of the recording portion increases as shown in FIG. 8, assuming that the ROM track having both-sides adjacent tracks both recorded is g1, the groove track having only one-side adjacent track recorded is g2, the groove track not recorded having no adjacent track recorded is g3, and the groove track recorded having no adjacent track recorded is g4, the push-pull amplitudes of the respective groove tracks vary, on the condition of satisfying the inequalities of g1>g4>g2>g3. As shown in FIG. 8, the push-pull amplitudes viewing at the land tracks l1, l2, l3, and l4 vary also, satisfying the same result as that of the groove tracks, namely, the push-pull amplitudes of the respective land tracks l1, l2, l3, and l4 vary in the order of l1>l4 >l2>l3. Moreover, even though the ROM track of g1 is the recorded groove track, the same result can be obtained.

As mentioned above, the value of the push-pull amplitude differs from the other in accordance with the recording state of the track to be treated with tracking and the track adjacent thereto. However, there is a fear that the tracking may become unstable, in particular, at the boundary between the recorded portion and the not-recorded portion.

Consequently, in order to solve the above problem, the servo gain of the tracking control is individually adjusted and changed over so as to stabilize the tracking in accordance with the recording states of the track to be treated with tracking and the track adjacent thereto, in the present invention.

In order to perform the afore-mentioned adjustment of the servo gain in the tracking control, it is necessary to control the address range of the recorded portion and that of the not-recorded portion and change over the tracking servo gain by dividing the case in accordance with the states of the respective track.

In order to attain the tracking control by dividing the case, it is preferable to record the information of the recorded portion's address range and that of the not-recorded portion's address range on the optical information recording medium. Although it is a generally employed method to record such information on the recordable CD (CD-R) and the MO (Magneto-Optic Disk), it is preferable to provide the portion for recording the information of the recorded portion's address range and that of not-recorded portion's address range in the area outside of the area in which the user records the information. The method is adopted for facilitating to practice the data treatment of the optical information recording medium (Disk Management). It is preferable to change over the gain of the tracking servo on the basis of the address information.

Figure 9:
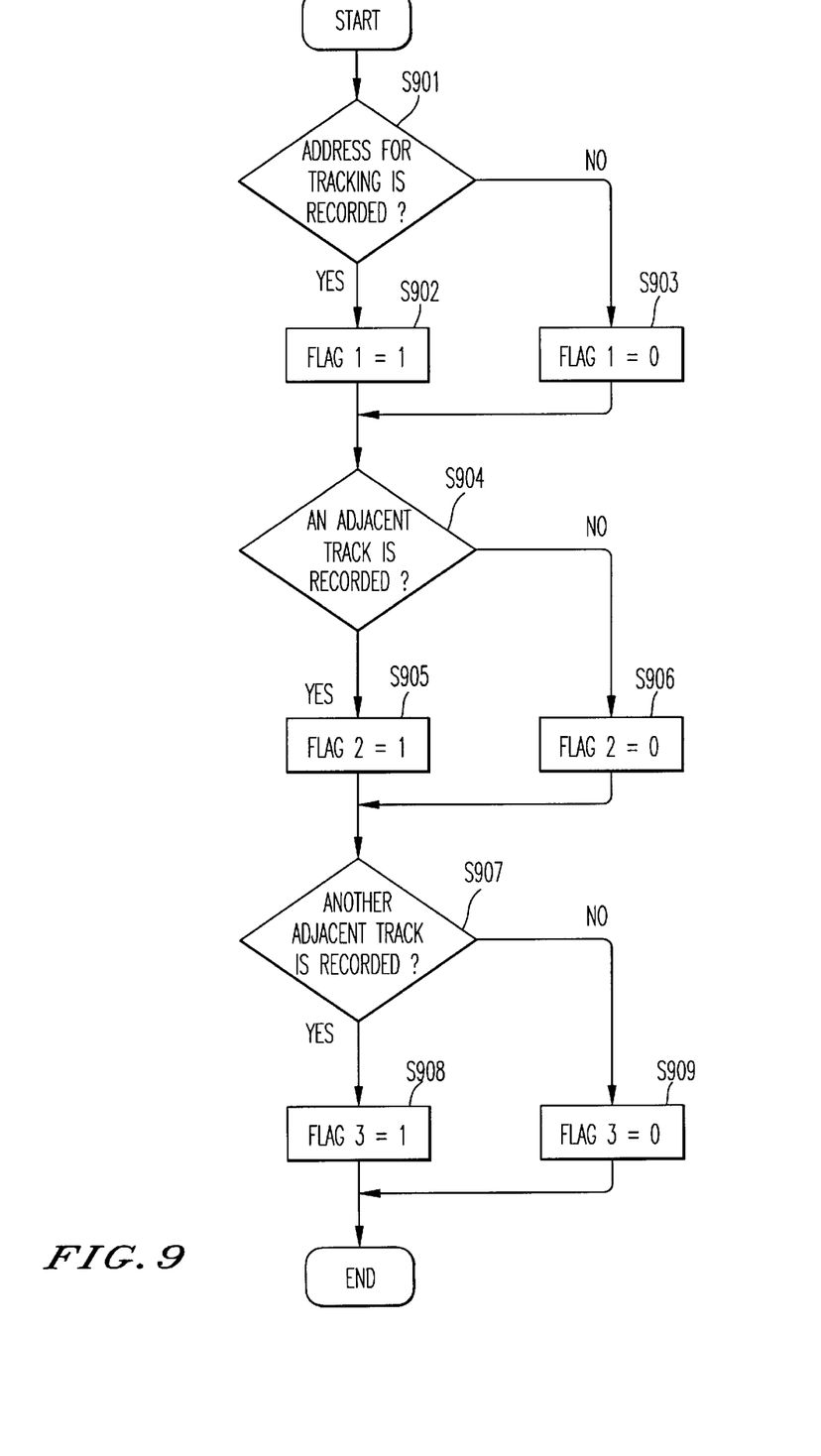
FIG. 9 is a flow chart of selecting the tracking servo gain from the information of the address range on the recorded portion and the address range on the not-yet-recorded portion.
Figure 10:
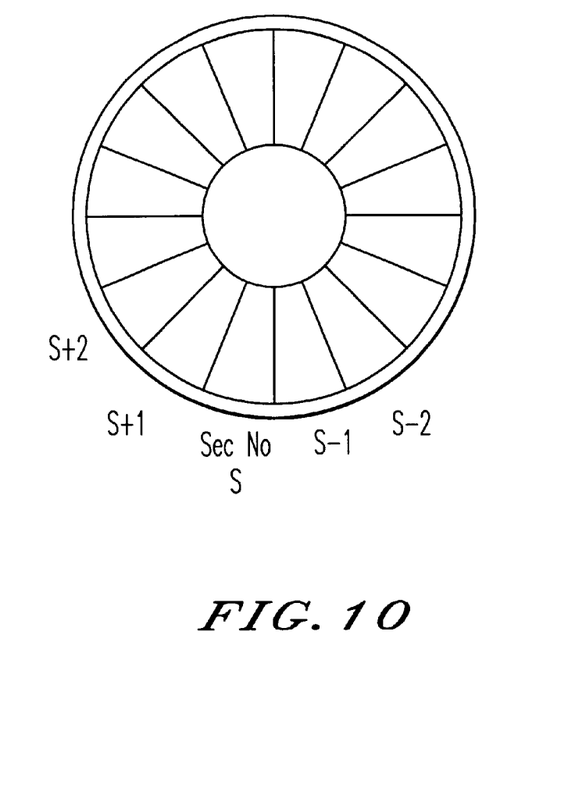
FIG. 10 is a diagram showing the sector number.
Figure 11:
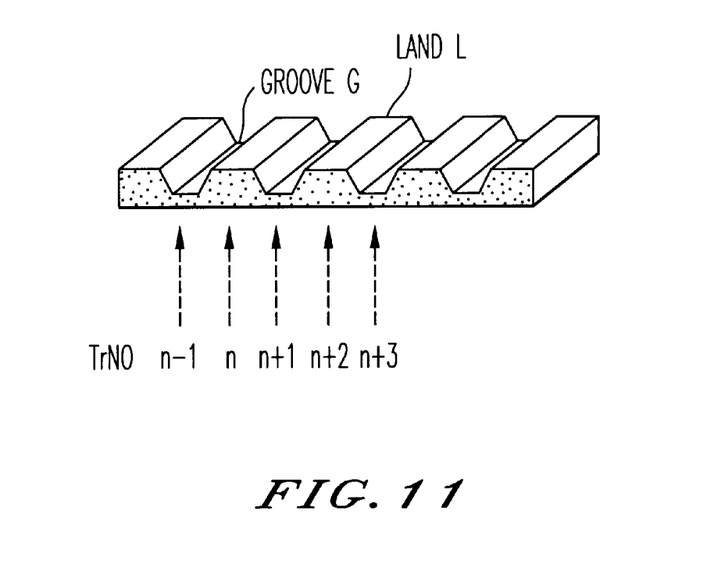
FIG. 11 is a diagram showing the track number.

FIG. 9 shows a flow chart of selecting the tracking servo gain from the information of the recorded portion's address range and that of the not-recorded portion's address range. Hereupon, the address information can be expressed by use of the combination of the sector number(s) and the track number (n) as shown in FIG. 10 and FIG. 11. FIG. 10 shows the sector number, and FIG. 11 shows the track number.

And further, in FIG. 9, FLAG 1 through FLAG 3 are provided for distinguishing the recorded state from the not-recorded state of the track itself to be treated with tracking and the track adjacent thereto.

At first, whether or not the address to be treated with tracking has been already recorded is judged (S901). If it has been already recorded, the FLAG 1 is set to "1" (S902). If it has been not yet recorded, the FLAG 1 is set to "0" (S903).

Following the above, whether or not either one of the adjacent tracks has been already recorded is judged (S904). If it has been already recorded, the FLAG 2 is set to "1" (S905). If it has been not yet recorded, the FLAG 2 is set to "0" (S906).

Following the above, the judgment whether or not the other track adjacent to the just adjacent track has been already recorded is practiced at the step S904 (S907). If it has been already recorded, the FLAG 3 is set to "1" (S908). If it has been not yet recorded, the FLAG 3 is set to "0" (S909). At this time, the processing terminates.

The tracking servo method according to the present invention is classified into the following eight states, on the basis of the result of the above-mentioned flow chart:

1. (FLAG 1, FLAG 2, FLAG 3)=(0, 0, 0) All of a track itself and both tracks just adjacent thereto have not yet been recorded.
2. (FLAG 1, FLAG 2, FLAG 3)=(0, 0, 1) A track itself has not yet been recorded, and either one of both tracks just adjacent thereto has been already recorded.
3. (FLAG 1, FLAG 2, FLAG 3)=(0, 1, 0) A track itself has not yet been recorded and either one of both tracks just adjacent thereto has been already recorded.
4. (FLAG 1, FLAG 2, FLAG 3)=(0, 1, 1) A track itself has not yet been recorded, and both tracks just adjacent thereto have been already recorded.
5. (FLAG 1, FLAG 2, FLAG 3)=(1, 0, 0) A track itself has been already recorded, and both tracks just adjacent thereto have not yet been recorded.
6. (FLAG 1, FLAG 2, FLAG 3)=(1, 0, 1) A track itself has been already recorded, and either one of both tracks just adjacent thereto has been already recorded also.

7. (FLAG 1, FLAG 2, FLAG 3)=(1, 1, 0) A track itself has been already recorded, and either one of both tracks just adjacent thereto has been already recorded also.
8. (FLAG 1, FLAG 2, FLAG 3)=(1, 1, 1) All of a track itself and both tracks just adjacent thereto have been already recorded.

In consideration of the relationship between the above eight states (1–8) and the push-pull amplitude, the tracking servo method according to the present invention is further classified into the following five groups, referring to FIG. 7 and FIG. 8:

Group A: 1
Group B: 2, 3
Group C: 4, 5
Group D: 6, 7
Group E: 8

As illustrated in FIG. 7 and FIG. 8, the magnitude of the tracking servo gain corresponding to one of those groups varies in the order of E>D>C>B>A in the case of employing the material having reflection rate which is lowered by recording, or in the order of A>B>C>D>E in the case of employing the other material having reflection rate which is raised by recording.

As described heretofore, firstly the user reproduce the address information in the state of "recorded/not-recorded" provided in the area outside of the area in which the data is recorded, and next, the classification thereof is performed in the process of the flow chart shown in FIG. 9 on the basis of the above address information. Finally, the tracking control is practiced with one of the tracking servo gains corresponding to the respective states. Consequently, a stable tracking state can be obtained.

<First Embodiment>

Next, the first embodiment of the optical information recording medium and the method of tracking servo for recording and reproducing optical information is explained, referring to the drawings, in the order of:

1) example of the groove arrangement and the groove shape;
2) example of manufacturing the optical information recording medium;
3) example of the method of controlling the tracking servo and
4) result of evaluating the signal characteristics.

1. Example of the Groove Arrangement and the Groove Shape

The groove arrangement of the first embodiment is the one same as that of the optical information recording medium according to the present invention shown in FIG. 1. And further, regarding the groove shape, if the groove depth of the pre-pit PP and the groove G is D, and the groove width of the pre-pit PP is W;

D≈800 Å, and
W≈04 μm.

Moreover, the groove width of the groove G is almost half of the track pitch TP. And further, regarding the other supplementary data, if the track pitch is TP, the wavelength of the recording/reproducing laser beam is λ, the beam diameter is BD, and the refraction index of the basic substrate is n;

TP 1.48 μm
λ=685 nm
BD=0.93 μm
n=1.58.

If the groove depth D of the pre-pit PP and the groove G and the groove width W of the pre-pit PP are calculated on the basis of the above-mentioned data in accordance with the conditional formula shown in the item "Limited Area of the Groove Shape on the Optical Information Recording Medium of the Invention", those factors satisfy the following inequalities respectively;

$520 \leq D \leq 950$ (Å)
$0.24 \leq W \leq 0.48$ (μm).

The numerical values of the optical information recording medium of the first embodiment of the invention satisfy the above conditions (inequalities). Namely, D≈800 Å
W≈0.4 μm.

2. Example of Manufacturing the Optical information Recording Medium

A stamper manufacturing flow for manufacturing the optical information recording medium of the first embodiment having the afore-mentioned groove shape is shown in FIG. 12, and the procedure of manufacturing the optical information recording medium of the first embodiment is explained concretely hereinafter. Moreover, the procedures (a)~(f) of manufacturing the optical information recording medium as described below coincides with the procedures (a)~(f) shown in FIG. 12.

Figure 12A:
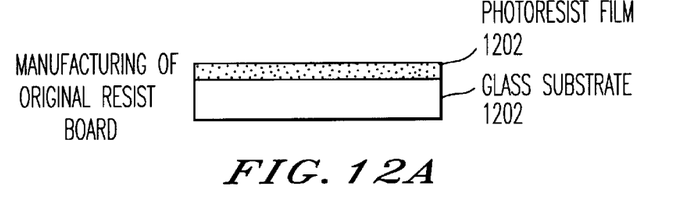
FIGS. 12a through 12f are diagrams showing the stamper manufacturing flow for manufacturing the optical information recording medium having the groove shape.

(a) By applying (painting) with the spin-coat method, a photoresist film 1202 is formed on a glass basic board 1201 on the following conditions:
Photoresist: OFPR800 (manufactured by Tokyo Ouka Co., Ltd.) . . . 2 cp thereof is diluted to almost 50%.
  Spin-coat Condition:
    First Rotation . . . 150 rpm
    Second Rotation . . . Approx. 600 rpm
    Pre-Bake Drying . . . 90° C., 30 Min.
The thickness of the resist film is approximately equal to the depth of the groove.

Figure 12B:
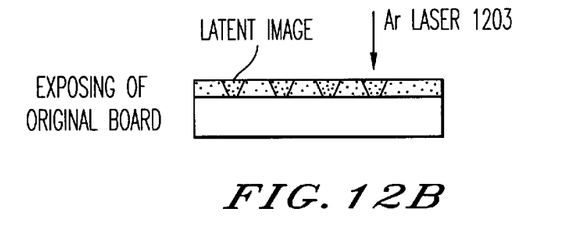
Figures 13, 14:
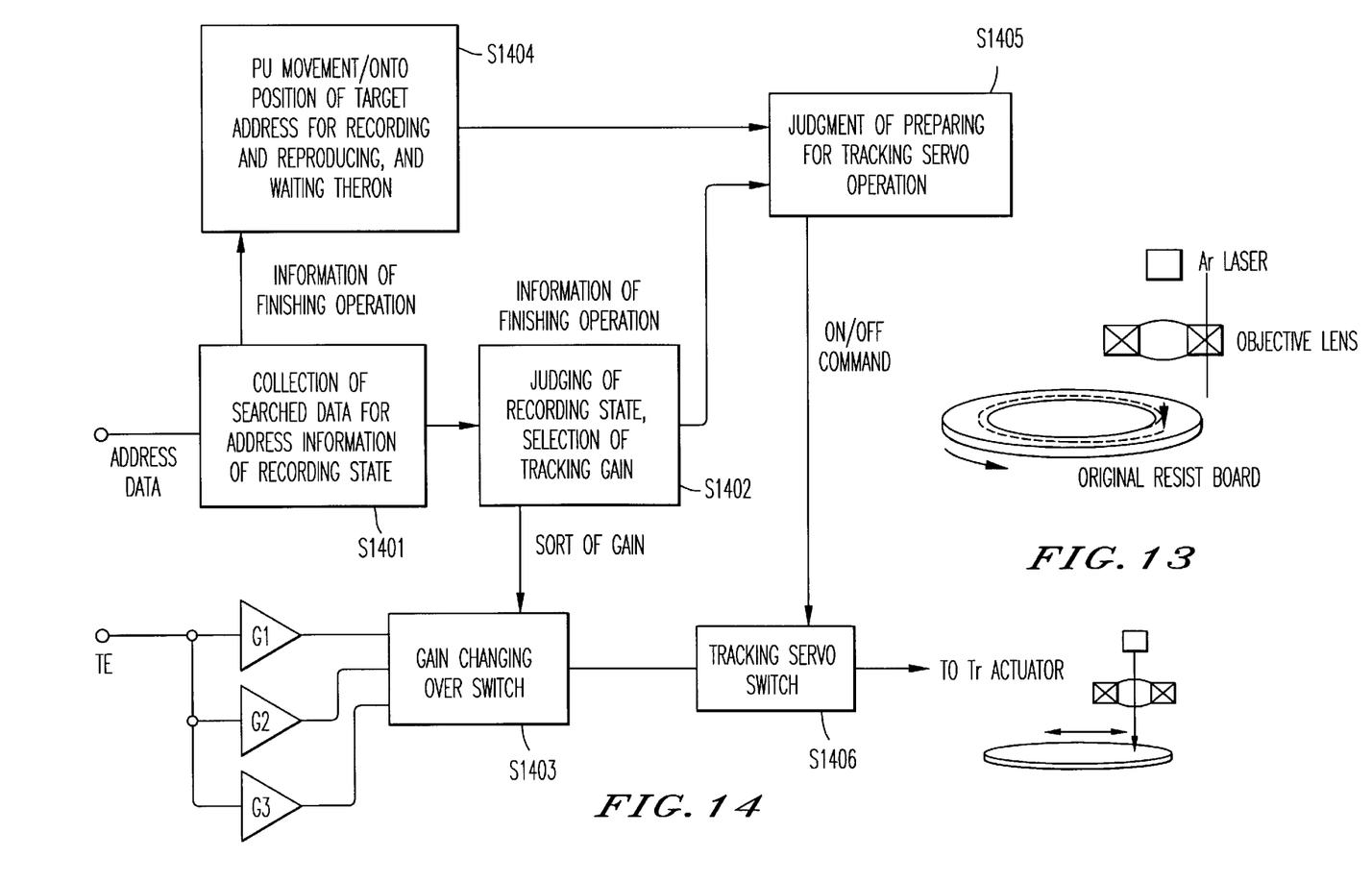
FIG. 13 is an outlined diagram for explaining the exposure of the original board.
FIG. 14 is a block diagram showing the circuit construction of the tracking control employed in the embodiment according to the present invention.

(b) As shown in the outlined view of the original substrate exposure of FIG. 13, the exposure of the original manuscript is executed with Ar laser and thereby a latent image is formed on the original resist substrate.

Figure 12C:
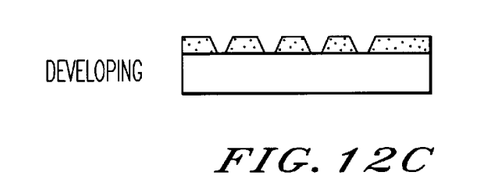

Exposing Beam: Ar Gas Laser
Laser Power on the Exposing Surface: Approx. 2 mW
Exposure Line Velocity: 1.2~1.4 m/s (c) A groove pattern is formed on the photoresist by developing.

Developer (Developing Agent):
  DE-3 (manufactured by Tokyo ouka Co., Ltd.)
  The original liquid is diluted to almost 30%.
Developing Time: 60 Sec.
Rinsing Time: Approx. 3 Min.
Post-Baking: 130° C., 30 Min.
At this time, the groove of the aforementioned shape is formed on the photoresist surface.

Figure 12D:
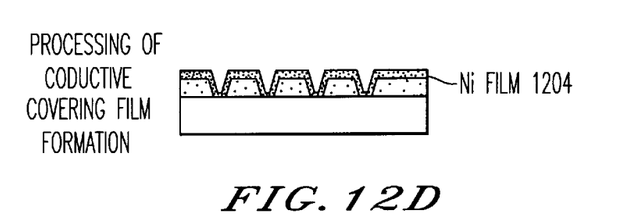
Figure 12E:
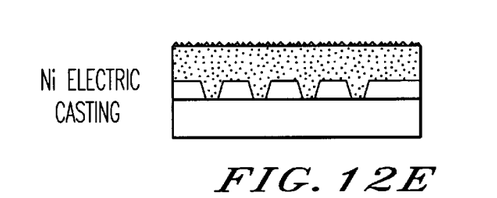
Figure 12F:
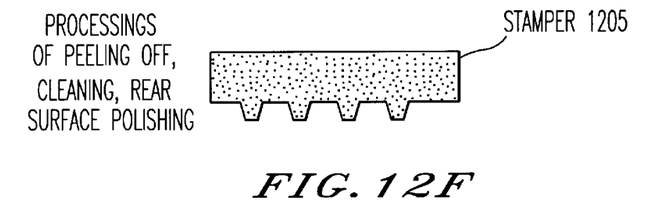

(d) A Ni-film 1204 of almost 500 Å is formed on the resist surface as an electrically conductive film.
(spattering Method)
(e) The stamper is treated with the electrotyping (electrocasting) method until obtaining its board thickness of almost 0.3 mm.
(f) The electrotyped rear surface thereof is polished, and thereafter cleaned for removing the resist not yet peeled off and remaining on the rear surface. And then, the inner diameter and the outer diameter are processed mechanically. In such way, the stamper 1205 is completed.

At last, a plastic basic substrate having a convex/concave pattern inverse to that of the stamper by use of the injection forming method.

Moreover, a phase-variation material AgInSbTe is employed as the recording material for the optical information recording medium. This is the one of a type of lowered reflection rate on the recording portion which is lowered by recording.

Basic Board (PC):
Dielectric Substance Layer (ZnS/SiO$_2$):
Film Thickness; 2000 Å
Recording Layer (AgInSbTe):
Film Thickness; 200 Å
Dielectric Substance Layer (AlN):
Film Thickness; 300 Å
Reflection Layer (Ag):
Film Thickness; 700 Å
Protection Layer (UV Hardened Resin)

3. Example of the Method of Controlling the Tracking Servo

FIG. 14 shows the circuit construction of the tracking servo control employed in the first embodiment. And further, although, in the item "Outline of the Tracking Servo Method according to the Present Invention", the classification of the tracking servo gain is explained as five groups, the classification thereof is explained as three groups. Hereupon, the classification of the three groups is as follows:

Group A: 1, 2, 3
Group B: 4, 5
Group C: 6, 7, 8

Furthermore, the respective tracking servo gains of the group A, the group B, and the group C are as follows:

Group A: G1
Group B: G2=G1×1.2
Group C: G3=G1×1.5

Next, the procedure of the tracking control method is explained as the steps S1401~S1406 in accordance with the circuit construction for the tracking control employed in the above first embodiment and the settings of the above-mentioned respective groups.

The information area (the area not used by the user) provided on the most inner circumferential portion of the optical information recording medium is reproduced in the step S1401, and the information state of the track to be treated with the tracking and the tracks just adjacent thereto.

In the step S1402, the group division (classification) judgment for the tracking servo gain is executed from the information obtained in the step S1401.

In the step S1403, the tracking gain is changed over, on the basis of the information judged in the step S1402.

In the step S1404, the pick up is moved onto the address to be treated with the tracking, after collecting the information of the recording state in the step S1401, namely, when the operation of the step S1401.

In the step S1405, the judgment for preparing the treatment of the tracking servo, on the basis of the termination of the operation in the steps of S1402 and S1404, In the step S1406, the treatment of the tracking servo is executed, on the basis of the judgment in the step S1405 and the changing-over in the step S1403.

A stable tracking state could be obtained by the tracking control method based on the procedure from the step S1401 to the step S1406 as mentioned above.

4. Result of Evaluating the signal Characteristics

Next, the result of evaluating the signal characteristics in the first embodiment is described hereinafter.

Modulation Rate:
0.4~0.5 (Reflection Rate; Approx. 20%)
Push-pull Amplitude;
Group A: 0.55~0.60
Group B: 0.45~0.50
Group C: 0.35~0.40
Evaluating Condition:
Wavelength $\lambda$ (of the recording/reproducing laser beam)= 685 nm
NA=0.6

As mentioned before, according to the first embodiment, the capacitance of the ROM can be set optionally and the physical continuousness of the ROM track and the RAM track can be kept. Furthermore, even though the groove depth of the pre-pit and that of the groove are equal to each other, it is possible to obtain the optical information recording medium having a tracking stability in the ROM area and the RAM area and capable of stably recording and reproducing the information.

Furthermore, as is apparent from the evaluation result of the signal characteristics, it is possible to precisely judge the recording states of the respective tracks in the ROM area and the RAM area. And further, even though the appropriate gains of tracking differ from each other in the ROM area and the RAM area, or even though the appropriate gains differ from each other in accordance with the presence or absence of recording, the tracking stability is high both in the ROM area and in the RAM area, and the information can be stably recorded and reproduced.

<Second Embodiment>

In the first embodiment, it is intended to obtain the stability of tracking by adjusting the servo gain in accordance with the recorded state of the push-pull amplitude variation due to recording. However, in the second embodiment, in order to solve the problem of the push-pull amplitude variation due to recording, a recording material having reflection rate which is not changed by recording is employed as the optical information recording medium.

Moreover, regarding the optical information recording medium, although only the polarization surface of the reflection rate rotates due to recording, the reflection rate itself does not change at all. And further, an optomagnetic material TeFeCo capable of reading out the information with the variation of the polarization surface rotation of the light rays reflected from the additionally written portion is employed as the recording layer of the optical information recording medium.

Consequently, since only the polarization surface of the reflection rate rotates due to recording and nevertheless the reflection rate does not change at all, it is possible to execute the tracking control with only one servo gain at the time of recording/reproducing. To state in other words, the appropriate gains for tracking in the ROM area and the RAM area are made equal to each other, and thereby it is possible to provide the optical information recording medium capable of obtaining the stable tracking state.

Advantageous Functional Effect of the Invention

As is apparent from the foregoing description, according to the optical information recording medium of the present invention (first status of the invention), since the track pitch of the pre-pit row is equal to that of the groove in the ROM area and the RAM area exists on the plain area between the adjacent pre-pit rows in the ROM area and on both portion of the land and the groove, the capacitance of the ROM can be set optionally and the physical continuousness can be kept between the ROM track and the RAM track.

And further, according to the optical information recording medium of the present invention (second status of the invention), in the recording medium of the first invention, any concave continuous groove track does not exist in the ROM area constructed with the pre-pit row, and assuming that the groove depth of the pre-pit is Dp, the groove depth of the groove is Dg, the wavelength of the recording/reproducing laser beam of the optical information recording medium is $\lambda$, and the reflection rate of the basic substrate in the optical information recording medium is n, those factors satisfy the following relationships (inequalities/equality) therebetween:

$$\lambda/n \times 0.12 \leq Dp = Dg \leq \lambda/n \times 0.24.$$

Consequently, even though the groove depth of the pre-pit is equal to that of the groove, the tracking stability is high both in the ROM area and the RAM area, and furthermore the recording/reproducing of the information can be done stably.

And further, according to the optical information recording medium of the present invention (third status of the invention), in the recording medium of the first invention, any concave continuous groove track does not exist in the ROM area constructed with the pre-pit row, and assuming that the groove width of the pre-pit is Wp and the beam diameter of the recording/reproducing laser beam in the optical information recording medium is BD, those factors satisfy the following relationships (inequalities):

$$BD \times 0.30 \leq Wp \leq BD \times 0.45$$

Consequently, the groove width of the pre-pit is optimized, and thereby the push-pull amplitude and the modulation rate both needed for stably executing the recording/reproducing operations can be obtained.

And further, according to the method of tracking servo for recording and reproducing optical information of the present invention (fourth status of the invention), the variation of the push-pull amplitude due to recording can be finely divided in accordance with the state of recording, and thereby the recording state of the track to be treated with tracking can be precisely classified. Namely, the recording state of the respective tracks can be judged precisely in the ROM area and the RAM area.

And further, according to the method of tracking servo (fifth status of the invention), since the tracking servo gain is changed over in accordance with the recording state of the track to be treated with tracking, the tracking state can be stabilized. As the result, even though the appropriate gains for tracking differ from each other in the ROM area and in the RAM area, or even though the appropriate gains differ in accordance with the presence or absence of recording, it is possible to provide the method of tracking servo in which the tracking stability is high both in the ROM area and in the RAM area and the recording/reproducing of the information can be done stably.

And further, according to the method of tracking servo (sixth status of the invention), it is also possible to provide the method of tracking servo in which the tracking stability is high both in the ROM area and in the RAM area and the recording/reproducing of the information can be done stably.

And further, according to the method of tracking servo (seventh status of the invention), it is also possible to provide the method of tracking servo in which the tracking stability is high both in the ROM area and in the RAM area and the recording/reproducing of the information can be done stably.

And further, according to the optical information recording medium of the present invention (eighth status of the invention), the data recorded by the user may not be wrongly recorded on any occasions, and the address information can be reproduced precisely. Consequently, it is possible to provide the optical information recording medium capable of precisely judge the recording state of the respective tracks in the ROM area and in the RAM area.

And further, according to the method of tracking servo (ninth status of the invention), it is possible to most suitably perform the classification (division) of the state of the recording on the track to be treated with tracking. Namely, the recording state of the respective track can be judged precisely in the ROM area and in the RAM area.

And further, according to the optical information recording medium (tenth status of the invention), since the recording material capable of reading out the information with the variation of the polarizing rotation of the reflected light rays is employed, there occurs no variation of the push-pull amplitude due to recording, and thereby a stable tracking state can be obtained. Namely, since the suitable gains of tracking in the ROM area and in the RAM area can be equalized to each other, it is possible to provide the optical information recording medium capable of obtaining a stable tracking state.

What is claimed as new and desired to be secured by Letters Patent of the United States is:

1. A method of tracking servo for recording and reproducing optical information, comprising:

providing an optical information recording medium of a land/groove recording system in which information is recorded on both of a convex groove track named land and a concave groove track named groove, wherein said optical information recording medium includes a ROM area constructed with a pre-pit row previously formed on a basic substrate together with a RAM area capable of being additionally written by a user on a sheet of medium, a track pitch of said pre-pit row of said ROM area being equal to that of said groove, said RAM area exits on a plain part between said pre-pit rows of said ROM area and both parts of said land and said groove, and said ROM area and address information showing the range of additionally written portions are provided in addition to the area in which the user records the datal judging, in order to judge the recording state of a track to be treated with tracking in said optical information recording medium, whether an address to be treated with tracking has been already recorded on the basis of said ROM area and said address information showing the range of said additionally written portion;

judging whether another address of the address adjacent to said track to be treated with tracking has been already recorded; and classifying, in accordance with the results of said judgments, said method of tracking servo separately into six groups including:
a first group of having not-yet-recorded track to be treated with tracking and other not-yet-recorded tracks adjacent to said track to be treated with tracking;
a second group of having not-yet-recorded track to be treated with tracking and having either recorded one of said other tracks adjacent to said track to be treated with tracking;
a third group of having not-yet-recorded track to be treated with tracking and having all of said other recorded tracks adjacent to said track to be treated with tracking;

a fourth group of having recorded track to be treated with tracking or having both of not-yet-recorded tracks adjacent to said ROM and said track;

a fifth group of having recorded track to be treated with tracking or having either recorded one of said tracks adjacent to said ROM and said track; and a sixth group of having recorded track to be treated with tracking or having both of said recorded tracks adjacent to said ROM and said track.

2. An optical information recording medium of a land/groove recording system in which information is recorded on both of a convex groove track named land and a concave groove track named groove, said optical information recording medium comprising:

a ROM area constructed with a pre-pit row previously formed on a basic substrate together with a RAM area capable of being additionally written by a user on a sheet of medium;

wherein a track pitch of said pre-pit row of said ROM area is equal to that of said groove, and said RAM area exists on a plain part between said pre-pit rows of said ROM area and both parts of said land and said groove;

wherein a concave continuous groove track does not exist in said ROM area constructed with said pre-pit rows; and wherein, assuming that the groove depth of said pre-pit is Dp, the groove depth of said groove is Dg, the wavelength of recording/reproducing laser beam for said optical information recording medium is λ, and the refractive index of the basic substrate of said optical information recording medium is n, those factors satisfy the following equality/inequalities:

$$\lambda/n \times 0.12 \leq Dp = Dg \leq \lambda/n \times 0.24.$$

3. An optical information recording medium of a land/groove recording system in which information is recorded on both of a convex groove track named land and a concave groove track named groove, said optical information recording medium comprising:

a ROM area constructed with a pre-pit row previously formed on a basic substrate together with a RAM area capable of being additionally written by a user on a sheet of medium;

wherein a track pitch of said pre-pit row of said ROM area is equal to that of said groove, and said RAM area exists on a plain part between said pre-pit rows of said ROM area and both parts of said land and said groove;

wherein a concave continuous groove track does not exist in said ROM area constructed with said pre-pit rows; and wherein, assuming that the groove width of said pre-pit is Wp, and the beam diameter of recording/reproducing laser beam for said optical information recording medium is BD, those factors satisfy the following inequalities:

$$BD \times 0.30 \leq Wp \leq BD \times 0.45.$$

4. A method of tracking servo for recording and reproducing optical information, comprising:

providing an optical information recording medium of a land/groove recording system in which information is recorded on both of a convex groove track named land and a concave groove track named groove, wherein said optical information recording medium includes a ROM area constructed with a pre-pit row previously formed on a basic substrate together with a RAM area capable of being additionally written by a user on a sheet of medium, a track pitch of said pre-pit row of said ROM area is equal to that of said groove, and said RAM area exists on a plain part between said pre-pit rows of said ROM area and both parts of said land and said groove; and judging a recording state of a track to be treated with tracking in said optical information recording medium, wherein the method of tracking separately classified into six groups including:

a first group of having not-yet-recorded track to be treated with tracking and other not-yet-recorded tracks adjacent to said track to be treated with tracking;

a second group of having not-yet-recorded track to be treated with tracking and having either recorded one of said other tracks adjacent to said track to be treated with tracking;

a third group of having not-yet-recorded track to be treated with tracking and having all of said other recorded tracks adjacent to said track to be treated with tracking;

a fourth group of having recorded track to be treated with tracking or having both of not-yet-recorded tracks adjacent to said ROM and said track;

a fifth group of having recorded track to be treated with tracking or having either recorded one of said tracks adjacent to said ROM and said track; and a sixth group of having recorded track to be treated with tracking or having both of said recorded tracks adjacent to said ROM and said track.

5. The method of tracking servo for recording and reproducing optical information by use of said optical information recording medium, as defined in claim 4, wherein, when said tracking servo is executed in an address area in said six groups, at least two different tracking servo gains are established corresponding to said six groups, and said tracking servo gains are changed over in accordance with said six groups.

6. The method of tracking servo for recording and reproducing optical information by use of said optical information recording medium, as defined in claim 5, wherein, in case that a reflection rate of a portion recorded by recording laser beam falls down, the magnitudes of said tracking servo gains are respectively set to a the value larger than a previous value in the order of said first, second, third, fourth, fifth, and sixth groups.

7. The method of tracking servo for recording and reproducing optical information by use of said optical information recording medium, as defined in claim 5, wherein, in case that a reflection rate of a portion recorded by recording laser beam rises up, the magnitudes of said tracking servo gains are respectively set to a value larger than a previous value in the order of said sixth, fifth, fourth, third, second, and first groups.

* * * * *